US 7,894,705 B2

(12) United States Patent
Satoh et al.

(10) Patent No.: US 7,894,705 B2
(45) Date of Patent: Feb. 22, 2011

(54) PLL CONTROLLER APPLYING A MULTIPLIER COEFFICIENT APPROPRIATE FOR A PHASE ERROR, AND A METHOD THEREFOR

(75) Inventors: Yasunori Satoh, Tokyo (JP); Takaaki Akiyama, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1302 days.

(21) Appl. No.: 11/442,999

(22) Filed: May 31, 2006

(65) Prior Publication Data

US 2006/0274199 A1 Dec. 7, 2006

(30) Foreign Application Priority Data

Jun. 1, 2005 (JP) ............................. 2005-160915

(51) Int. Cl.
*H04N 5/932* (2006.01)
*H04N 5/935* (2006.01)

(52) U.S. Cl. ...................... 386/201; 386/202; 386/204; 386/205

(58) Field of Classification Search .................. 386/1, 386/2, 3, 6, 7, 46, 47, 48, 51, 68, 81, 85
See application file for complete search history.

(56) References Cited

U.S. PATENT DOCUMENTS 5,142,377 A * 8/1992 Moriyama et al. ............. 386/2

FOREIGN PATENT DOCUMENTS

| JP | 10-224732 | 8/1998 |
| JP | 2003-23597 | 1/2003 |

* cited by examiner

*Primary Examiner*—Thai Tran
*Assistant Examiner*—Hung Q Dang
(74) *Attorney, Agent, or Firm*—Studebaker & Brackett PC; Donald R. Studebaker

(57) ABSTRACT

A PLL controller for controlling the tracking rate of a phase-locked loop (PLL), in particular, controlling coefficients to be input to a device such as a multiplier of the phase-locked loop. A PLL controller receives a phase error between a horizontal sync signal in a video signal and a reference signal. Then an error amount detector measures the phase error using the N thresholds to output a control signal indicating any of N+1 levels. A coefficient selector outputs one of the N+1 gains as a coefficient signal, the one gain corresponding to the level indicated by the control signal, so that the tracking rate of the phase-locked loop is controlled in response to the input video signal, and thus a high-quality video image with less jitter can be provided.

6 Claims, 7 Drawing Sheets

PLL CONTROLLER APPLYING A MULTIPLIER COEFFICIENT APPROPRIATE FOR A PHASE ERROR, AND A METHOD THEREFOR

BACKGROUND OF THE INVENTION

1. Field of the Invention

The present invention relates to a phase-locked loop (PLL) controller for controlling a phase-locked loop provided for, e.g. a digital video decoder for decoding video signals, and, in particular, a PLL controller for controlling a coefficient to be input to a device such as an analog multiplier in the phase-locked loop. The present invention also relates to a method for controlling the same.

2. Description of the Background Art

Conventionally, in devices such as digital video decoders, a frequency error has occurred between an input video signals and the reference signal, thus providing a jittered video image.

For example, as shown in FIG. 5, a video signal 400 generally has sets of vertical blanking period 402 and effective video period 404. In each of the sets, the period of a field is defined starting with a vertical sync pulse 406 in the vertical blanking period 402. Furthermore, as shown in FIG. 6 depicting a part 408 in the effective video period 404 of the video signal 400 enlarged, each horizontal line has sets of horizontal blanking period 412 and effective video period 414. In each of the sets, the period of a line is defined starting with a horizontal sync pulse 416 in the horizontal blanking period 412.

Some type of digital video decoders contains a phase-locked loop to generate a line lock clock signal locked to the period of one line. The line lock clock signal is used to sample an analog video signal so as to allow the same part of each line to be sampled to thereby obtain jitter-free video images.

However, some kinds of video signals are not standardized but include a line whose period is deviated from the standardized period, i.e. not consistent with the reference period. For example, if a video signal is reproduced by a video cassette player (in a normal or special reproduction), each line may have its actual period contain a little error against the reference period, so that the signal may include a line of which the error is larger. In a television broadcast system, transmitting video signals on weak electric field waves, even though video signals consisting of the lines consistent with the reference period are transmitted, they will be received with noise mixed so that the period of each line will be falsely detected.

Correspondingly, some kind of conventional PLL controllers for controlling a phase-lock loop is adapted to change, in the case of a video signal reproduced by a video cassette player or from a weak electric field signal of television, the tracking rate of the phase-locked loop in response to an external command. When such controllers process a signal reproduced by a video cassette player, the controllers have the phase-locked loop quickly, or strongly, track the errors in the lines of the signal to attain video images with less jitter. When the controllers process a weak electric field signal of television, the controllers have the phase-locked loop slowly, or weakly, track the errors in the lines of the signal to curb influence from the false detection of the period of each line as much as possible.

For example, as shown in FIG. 7, a phase-locked loop 20 receives a horizontal sync signal 112 obtained from a video signal by sync separation, compares the horizontal sync signal 112 with a reference signal 130 having a reference period by a phase comparator 22 to determine a phase error 114, and filters the phase error 114 with a filter 24 to obtain a process result 116. Furthermore, the phase-locked loop 20 multiplies the process result 116 by a certain coefficient 434 by multipliers 26 and 28 to obtain multiplied results 118 and 120, respectively, and stores the multiplied result 120 in a delay circuit 30 to obtain a delay result 122. The phase-locked loop 20 further forms a control signal 126 by a voltage-controlled oscillator (vco) 32 according to the multiplied result 118 and the delay result 122 to output to an analog phase-locked loop 34, and forms a reference signal 130 by a line counter 36 in response to a line lock clock signal 128 from the analog phase-locked loop 34.

In a conventional PLL controller 420, provided in connection with the phase-locked loop 20, a control signal 432 is input from outside, which indicates whether a video signal is one reproduced by a video cassette player or a weak electric field signal of television. In response to the input control signal 432, a coefficient switch 422 selects a coefficient 434 to be output to the multipliers 26 and 28 so as to appropriately control the tracking rate of the phase-locked loop 20.

Japanese laid-open publication No. 224732/1998 discloses a determining circuit for determining a special reproduction signal which circuit has a counter for counting clocks of a signal reproduced by a video cassette player. The leading edge of a vertical sync signal is detected by an edge detector. The counter is cleared at the timing of the leading edge thus detected, and counts the number of clocks in each period. The number of clocks in one period is compared with the number of reference clocks by a comparator, thus enabling it to determine whether the reproduced signal is of a fast forwarding replay or rewinding replay.

Japanese laid-open publication No. 2003-23597 discloses a video processor which has a sync processor using a phase-locked loop for synchronizing vertical, interlace, horizontal and chroma signals to measure a pullout in the phase-locked loop; and a determining means for using the measurement signal of a pullout in the phase-locked loop obtained by the sync processor to determine the parameters of the weak electric field. When a certain number of pullouts occur at a predetermined period of time, the video processor cancels the detection result of a copy guard signal.

However, in the conventional PLL controllers, a coefficient input to a multiplier in a phase-locked loop has to be controlled from outside, and therefore types of a video signal to be input to the phase-locked loop should be recognized in advance.

SUMMARY OF THE INVENTION

It is an object of the present invention to provide a PLL controller and a method for controlling the same, in which a phase-locked loop is controlled without externally controlling a coefficient even when a video signal is not standardized, and thus allowing a high-quality video image with less jitter to be provided.

A PLL controller of the present invention which obtains a phase error between a horizontal sync signal period in a input video signal and a reference period of a reference signal, filters the phase error, and multiplies a result from the filtering by a multiplier by a predetermined multiplier coefficient to control a phase-locked loop. The PLL controller is responsive to the obtained phase error, and detects the predetermined multiplier coefficient on the basis of the phase error to supply the phase-locked loop with the predetermined multiplier coefficient to control the change of the tracking rate of the phase-locked loop.

Furthermore, a method of the present invention for controlling a phase-locked loop comprises the steps of obtaining a phase error between a horizontal sync signal period in a input video signal and a reference period of a reference signal, filtering the phase error, multiplying the result from the filtering by a multiplier with a predetermined multiplier coefficient, receiving the obtained phase error to detect the predetermined multiplier coefficient on the basis of the phase error, and providing the phase-locked loop with the predetermined multiplier coefficient to thereby control the change of the tracking rate of the phase-locked loop.

In accordance with the PLL controller of the present invention, an error state is detected by an error amount detector according to an error between a horizontal sync signal period of an input video signal and a reference period of a reference signal. By selecting a coefficient which corresponds to the detected state by a coefficient selector, a suitable coefficient can be output to a phase-locked loop, regardless of the type of the video signal, so that a high-quality video image with less jitter can be provided in the phase-locked loop.

In addition to that, the PLL controller of the present invention includes a field counter, a detector for detecting special reproduction of a video cassette player, a detector for detecting normal reproduction of a video cassette player and a detector for detecting weak electric field of television. The PLL controller automatically determines whether a video signal is a reproduction signal of a video cassette player or a weak electric field signal of television, and changes a coefficient according to the type of the video signal thus determined so as to output a suitable coefficient to the phase-locked loop in regardless of the type of the video signal.

The PLL controller also can eliminate a drawback such that, when a video signal is a weak electric field signal and an error caused by the false detection of a sync signal is large, tracking rate would become faster and jitter occurs frequently.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
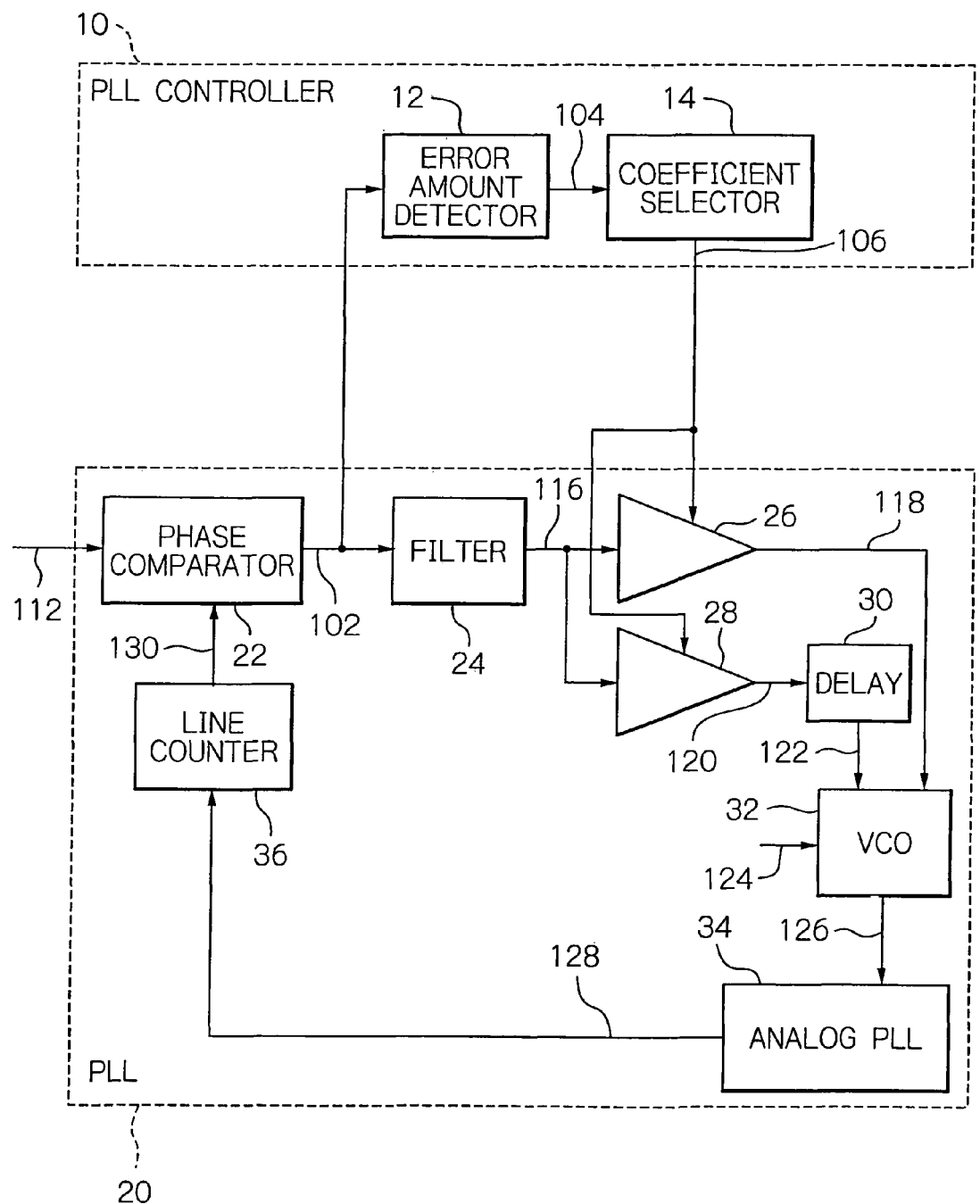
FIG. 1 is a schematic block diagram showing a preferred embodiment and its application of a PLL controller of the present invention.

With reference to the accompanying drawings, a phase-locked loop (PLL) controller according to a preferred embodiment of the present invention will now be described in detail. As shown in FIG. 1, a PLL controller 10 of the present invention is adapted to detect a coefficient signal 106 by an error amount detector 12 and a coefficient selector 14 on the basis of a phase error 102 provided by a phase comparator 22 of a phase-locked loop, and to use the coefficient signal 106 to thereby control the tracking rate of the phase-locked loop 20. Parts not directly related for understanding the invention are omitted from the drawings and description so as to avoid redundancy.

The error amount detector 12 in the preferred embodiment functions as controlling the coefficient selector 14 according to the inputting phase error 102. Specifically, the error amount detector 12 uses one or more thresholds such as N thresholds, where N is a predetermined positive integer, and measures the phase error 102 at N+1 levels to produce a control signal 104 indicating the level as measured to the coefficient selector 14. The error amount detector 12 also may generate the information indicating any of the states 0 to N in the form of control signal 104.

The coefficient selector 14 is adapted to supply the phase-locked loop 20 with the coefficient signal 106 which corresponds to the control signal 104 from the error amount detector 12. For example, in response to the control signal 104 indicating any of the N+1 levels, the coefficient selector 14 outputs one of N+1 gain signals as the coefficient signal 106, which corresponds to the level indicated by the control signal 104.

The coefficient selector 14 outputs the gain in the form of coefficient signal 106 in response to the control signal 104, the gain being retrieved from a memory, not shown, in which the data representing N+1 gains are stored in advance, which are capable of controlling the tracking rate suitable for each phase error at the N+1 levels. Alternatively, the data of N+1 gains are stored in a memory, not show also, of the phase-locked loop 20, and when the coefficient selector 14 provides the phase-locked loop 20 with the coefficient signal 106 indicating any of states 0 to N, the phase-locked loop 20 retrieves from the memory the gain corresponding to the state indicated by the coefficient signal 106.

The error amount detector 12 and the coefficient selector 14 may be adapted to operatively select a smaller gain when the phase error 102 is smaller and select a larger gain when the phase error 102 is larger to thus control the tracking rate of the phase-locked loop 20 to be proportional to the gain.

The phase-locked loop 20 of the preferred embodiment may be adapted to compare a horizontal sync signal 112 of a video signal with a reference signal 130 having a reference phase, and obtain the phase error voltage 102 from the result of the comparison to output the latter to the PLL controller 10. Alternatively, the phase-locked loop 20 can be provided with a filter 24, which is adapted to filter the phase error voltage 102 to obtain a process result 116, which is then operated by multipliers 26 and 28 with the gain 106 so as to obtain multiplied results 118 and 120, respectively.

Furthermore, the phase-locked loop 20 may be adapted to delay the multiplied result 120 of the multiplier 28 by a delay circuit 30 to obtain an integrated result 122, and then generate a control signal 126 by a voltage-controlled oscillator (vco) 32 in accordance with the multiplied result 118 of the multiplier 26 and the integrated result 122. In that case, the control signal 126 is output to an analog phase-locked loop 34, and a reference signal 130 is generated by a line counter 36 in response to a line lock clock 128 provided by the analog phase-locked loop 34.

The phase-locked loop 20 is also adapted for receiving the horizontal sync signal 112 obtained from the video signal by sync separation. The phase-locked loop 20 may be designed to receive a line phase derived from the horizontal sync signal 112 to provide it to the phase comparator 22.

The phase comparator 22 serves as obtaining the phase error 102 in response to the horizontal sync signal 112 and the reference signal 130. The phase comparator 22 may be adapted to detect a phase difference between the horizontal sync signal 112 and the reference signal 130 up to 180°, such that, e.g. when the period of the reference signal 130 extends over the 858 clocks, the phase error 102 up to ±429 clocks can be obtained.

In addition, the phase comparator 22 may be structured to receive, as a reference signal 130, a feedback line phase generated from the line lock clock 128 by the counter 36, thereby comparing a line phase input by the horizontal sync signal 112 with the feedback line phase to obtain the phase error 102.

The filter 24 may be of the type including a loop filter such as a low-pass filter which cuts off high-frequency components and noises of the phase error voltage to output the filtered result 116 in direct current.

The multipliers 26 and 28 may be adapted to multiply the process result 116 from the filter 24 by the gain indicating the coefficient signal 106 provided by the coefficient selector 14 in the PLL controller 10, thereby giving the calculation results 118 and 120, respectively. Although the two multipliers 26 and 28 are provided to the phase-locked loop 20 in the preferred embodiment, it is possible to provide a single multiplier which outputs the same calculation results as the two calculation results 118 and 120.

The delay circuit 30 functions as delaying the multiplied result 120 with respect to the multiplied result 118, and may be implemented by, e.g. an integrating circuit for delaying the result 120 for a predetermined timing.

The voltage-controlled oscillator 32 of the preferred embodiment may be an oscillator for producing an M-divided sampling sinusoidal wave, where M is a positive integer, of a target clock to be generated according to the multiplied result 118 and the integrated result 122, and also in response to a reference clock 124, to output a sinusoidal wave digital signal 126 having the sinusoidal waveform.

For example, the voltage-controlled oscillator 32 may be structured, when generating 4-divided sampling sinusoidal waves, in the case of the analog phase-locked loop 34 generating a clock of 27 MHz, such as to generate a 6.75 MHz sinusoidal wave. At this time, the counter operates in response to the reference clock 124, and from an operational clock an incremental value of each clock for the counter is obtained to add the multiplied result 118 and the integrated result 122 to the obtained addition value to thereby control the frequency of the sinusoidal wave, so that the sinusoidal wave of 6.75 MHz is produced.

The analog phase-locked loop 34 may be designed to convert the input sinusoidal wave digital signal 126 from digital to analog and multiply the obtained result of the conversion to generate the line lock clock 128 to output the latter to the line counter 36. The phase-locked loop 34 may consist of, for example, a digital-to-analog converter (DAC) and a multiply circuit. When the four-divided sinusoidal wave digital signal 126 is supplied, the analog phase-locked loop 34 is preferably adapted for quadrupling the signal 126, after analog-converted, to thereby form the line lock clock 128.

The line counter 36 serves as generating and outputting the reference signal 130 corresponding to a count of the line lock clock signals 128. For example, when one line contains 858 clocks, the line counter 36 counts the clocks from 0 to 857 in response to the line lock clock signal 128 to generate the reference signal 130 having the independently established line phase as a reference phase.

Figure 2:
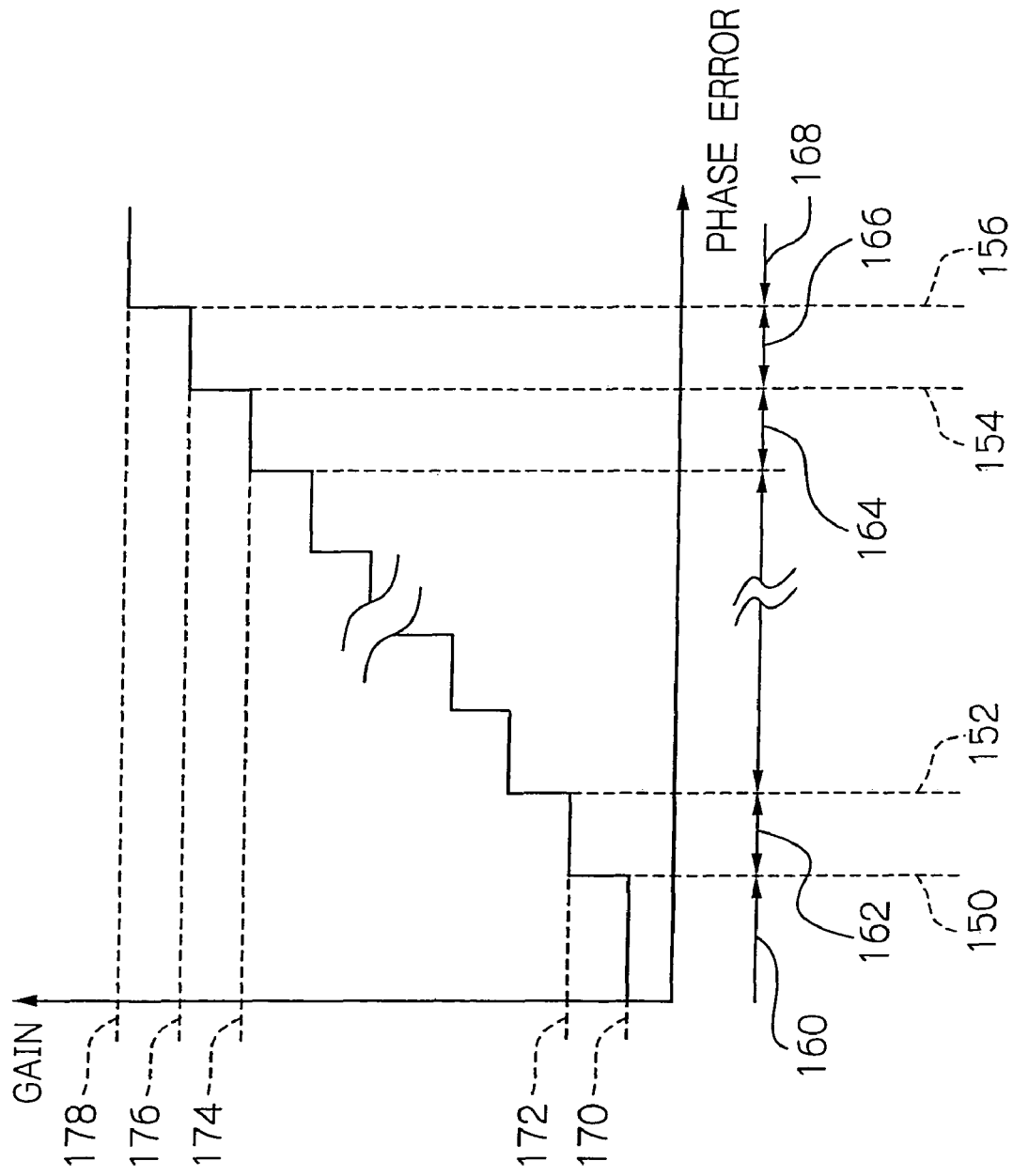
FIG. 2 shows the relation between a phase error and a gain in accordance with the preferred embodiment of the PLL controller shown in FIG. 1.

The operation of the PLL controller 10 according to the preferred embodiment will now be described. In the PLL controller 10, the phase error 102 from the phase-locked loop 20 is input to the error amount detector 12 on a line-to-line basis. The phase error 102 is compared with the N thresholds in the error amount detector 12 to find out one of the N+1 segments which corresponds to the phase error 102, the N+1 segments being correspondingly formed by the N thresholds. As shown in FIG. 2 for instance, when the N thresholds contain the first and second thresholds 150 and 152 and also the (N−1)-th and N-th thresholds 154 and 156, the phase error 102 falls in any one of the N+1 segments including the first and second segments 160 and 162 and also the (N−1)-th, N-th and (N+1)-th segments 164, 166 and 168, so that the corresponding segment is detected.

The control signal 104 indicating the detected segment corresponding to the phase error 102 is produced in the error amount detector 12. For example, the control signal 104 indicating any one of the states 0 through N is produced and provided to the coefficient selector 14.

In the coefficient selector 14, one of the N+1 gains which corresponds to the phase error 102 is detected according to the segment indicated by the control signal 104. As shown in FIG. 2 for instance, the N+1 gains contain the first and second gains 170 and 172 and also the (N−1)-th, N-th and (N+1)-th gains 174, 176 and 178, each corresponding to one of the N+1 segments, in which the smaller gain corresponds to the smaller phase error 102 and the larger gain corresponds to the larger phase error 102.

Then the coefficient signal 106 indicating the gain detected in response to the control signal 104 is developed by the coefficient selector 14 and provided to the phase-locked loop 20, in particular, provided to the multipliers 26 and 28. In this way, the PLL controller 10 can detect the gain controlling the tracking rate of the phase-locked loop 20 in response to the input video signal.

Figure 3:
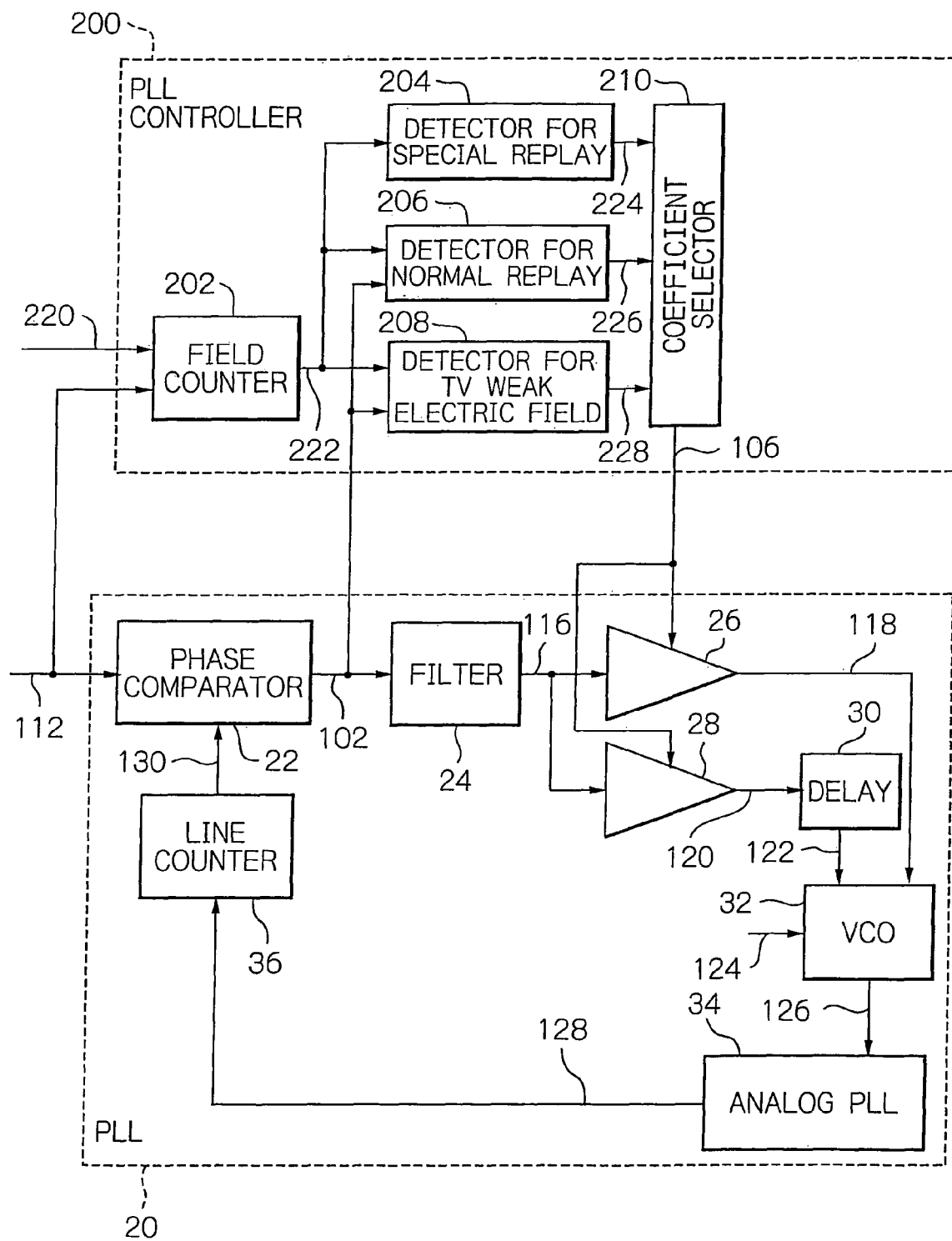
FIG. 3 is a schematic block diagram showing an alternative embodiment and its application of a PLL controller of the present invention.

In accordance with an alternative embodiment, a PLL controller 200, shown in FIG. 3, includes a field counter 202 for generating a count signal 222 indicating the number of lines in response to a horizontal sync signal 112 and a vertical sync signal 220 of a video signal, as well as detectors 204, 206 and 208, respectively for special and normal reproductions of a video cassette player and weak electric field of television. The detectors 204, 206 and 208 detect the count signal 222 and a phase error voltage 102 provided by a phase-locked loop to output respective detection results 224, 226 and 228 thus obtained to a coefficient selector 210. The coefficient selector 210 determines a gain according to the detection results 224, 226 and 228 to output a coefficient signal 106 indicating the gain thus determined.

The field counter 202 is adapted to count the lines in response to the horizontal sync signal 112 and the vertical sync signal 220 derived from the video signal, so as to obtain information such as the number of lines in one field, vertical blanking interval and effective video interval, to output the count signal 222 indicating those pieces of information. The field counter 202 may also be adapted to receive a line phase based upon the horizontal sync signal 112 and a field phase based upon the vertical sync signal 220 to count the lines according to the line phase and the field phase.

The detector 204 for special reproduction of a video cassette player is adapted to determine the characteristics of a special reproduction signal such as fast forwarding and rewinding of a video cassette player for the purpose of detecting such signals. For example, a video signal is typically formed to include 262.5 lines per field. However, the special reproduction signal of a video cassette player is formed with the number of lines per field different from the normal number of lines per field. For instance, the reproduction signal is distinctively formed with the number of lines per field several lines to dozens shorter or longer than the normal video signal. The detector 204 for special reproduction of a video cassette player utilizes such characteristics to determine the number of lines per field, thereby detecting whether or not the video signal is a special reproduction signal of a video cassette player to output the detection result 224.

The detector 204 for special reproduction of a video cassette player of the present embodiment may be designed to measure the number of lines indicated by the count signal 222 from the field counter 202, so that, when the number of lines per field-differs from the normal number of lines per field by several lines to dozens, the video signal is determined as a special reproduction signal of a video cassette player. In that case, the detector 204 produces a flag, as the detection result 224, which indicates, for example, a binary one when detected the special reproduction signal of a video cassette player and otherwise a binary zero.

The detector 206 for normal reproduction of a video cassette player functions as determining the characteristics of a normal reproduction signal of a video cassette player for the purpose of detecting these signals. For example, if the video signal is a normal reproduction signal of a video cassette player, the video signal has characteristics such that the period of a line right before (several lines before) the vertical sync pulse is different from the normal period, e.g. such a line is larger in phase error of the period. The detector 206 for normal reproduction of a video cassette player utilizes such characteristics to determine whether or not the line included in the vertical blanking interval and preceding the vertical sync pulse is larger in phase error so as to detect whether or not the video signal is a normal reproduction signal of a video cassette player to output the detection result 226.

If the detector 206 for normal reproduction of a video cassette player of the present embodiment has its detection range set during the vertical blanking interval and in front of the vertical sync pulse, the detector 206 locates the detecting range in response to the count signal 222 from the field counter 202 to discriminate whether or not each line is within the detecting range. Furthermore, the detector 206 may be structured such that, when the lines within the detecting range are detected larger in phase error 102, the video signal is determined as the normal reproduction signal of a video cassette player, to generate as the detection result 226, a flag which indicates, for example, a binary one in the case of the normal reproduction signal of a video cassette player detected and otherwise a binary zero.

In addition, the detector 206 for normal reproduction of a video cassette player may be adapted to keep tracking the phase error 102 of each line to detect the larger phase error 102 in the detecting range, such that, when the phase errors 102 of other lines are small, the video signal may be detected as a normal reproduction signal of a video cassette player. In that case, the lines of which the phase errors 102 are ±6 clocks or more may be determined as the line having larger phase error whereas the line whose phase errors 102 are ±3 clocks or less may be determined as the line having smaller phase error. Furthermore, the detector 206 for normal reproduction of a video cassette player may be adapted to detect a normal reproduction signal of a video cassette player for each line.

The detector 208 for weak electric field of television is adapted for detecting whether or not a video signal is a weak electric field signal of television, and then output the detection result 228 thereof. Although all the lines of a video signal could involve phase errors, the lines are not constantly shifted in period, so that the phase errors can be longer or shorter in period. The detector 208 for weak electric field of television in the present embodiment thus tracks the phase error in each line to determine, when the detector 208 detects a period involving an error with a longer period together with an error with a shorter period, i.e. error-fluctuating period, a predetermined number of times during one field interval, the video signal as the weak electric field signal of television.

For example, the detector 208 for weak electric field of television may be structured as detecting a weak electric field signal of television according to the phase error 102 and the count signal 222. In that case, the detector 208 may be adapted to determine the weak electric field signal with one error-fluctuating period set if the line immediately preceding the present line is smaller in error than the line preceding the present line by two lines and than the present line also, or if the line immediately preceding the present line is larger in error than the line preceding the present line by two lines and than the present line also. The detector 208 for weak electric field of television thus detects the video signal as the weak electric field signal of television when the error-fluctuating periods are detected over a certain times. For example, the detector 208 generates as the detection result 228 a flag, which indicates logical one in the case the weak electric field signal of television detected and otherwise logical zero.

Furthermore, the detector 208 for weak electric field of television may include a memory for temporarily storing the errors in a line before two or one line. The detector 208 for weak electric field of television may detect weak electric field signals on a line-to-line basis.

The coefficient selector 210 in the present embodiment serves as determining gains according to the detection results 224, 226 and 228, respectively from the detector 204 for special reproduction of a video cassette player, the detector 206 for normal reproduction of a video cassette player and the detector 208 for weak electric field of television. For example, when the detection of a special reproduction signal for a video cassette player or a normal reproduction signal of a video cassette player is confirmed on the basis of the detection results 224 and 226, the coefficient signal 106 indicating a large gain is output, and in the other case, when the detection of a weak electric field signal of television is confirmed on the basis of the detection result 228 or when all detection results 224, 226 and 228 are not detected, the coefficient signal 106 indicating a small gain is output.

The coefficient selector 210 preferably determines gains by mostly prioritizing the detection result 224 from the detector 204 for special reproduction of a video cassette player, secondly prioritizing the detection result 226 from the detector 206 for normal reproduction of a video cassette player and thirdly prioritizing the detection result 228 from the detector 208 for weak electric field of television.

In this way, the PLL controller 200 in the present embodiment can detect, if the video signal input to the phase-locked loop 20 is the special reproduction signal of a video cassette player, the normal reproduction signal of a video cassette player or the weak electric field signal of television, a gain suitable for each of these signals, and thus selecting the tracking rate of the phase-locked loop 20 according to the type of the signals.

Figure 4:
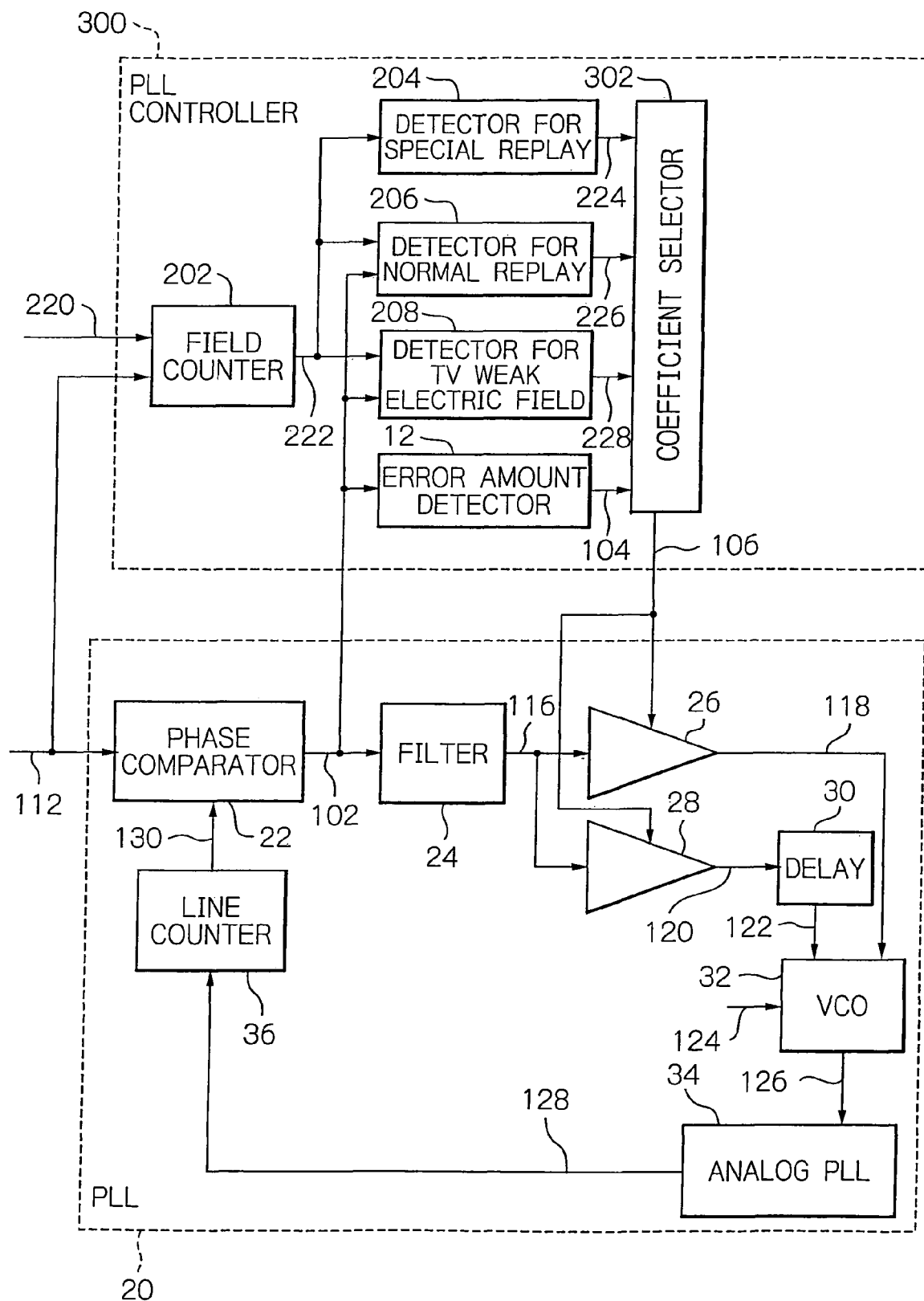
FIG. 4 is a schematic block diagram showing a further alternative embodiment and its application of a PLL controller of the present invention.
Figure 5:
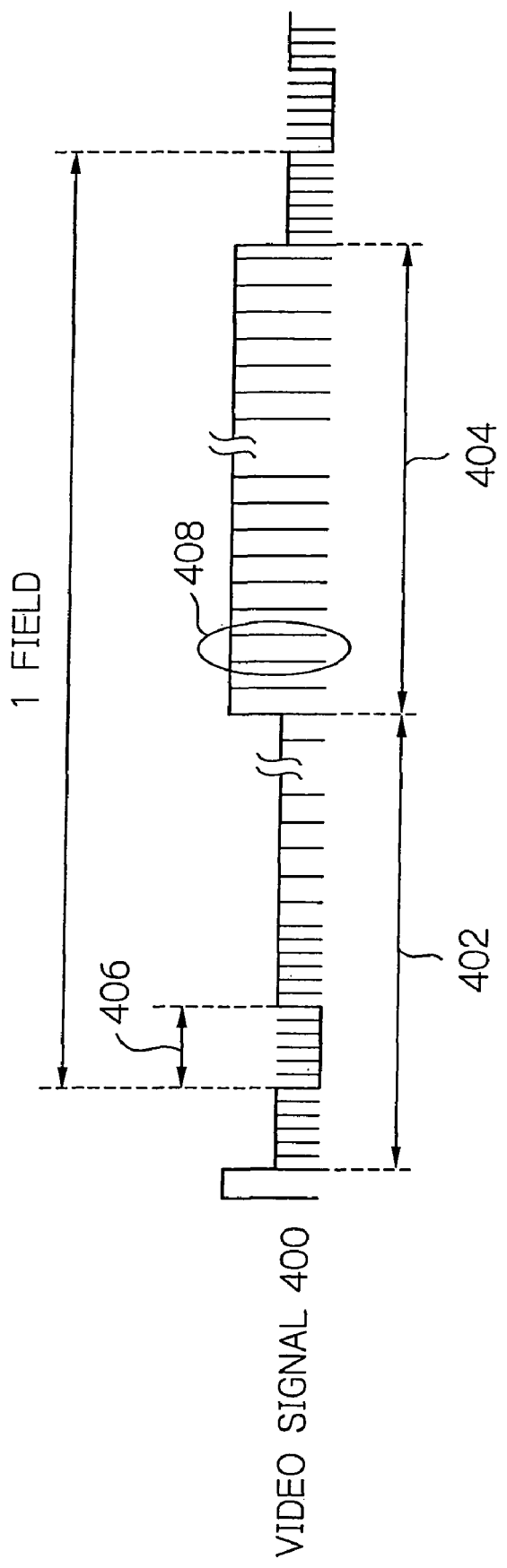
FIG. 5 shows an exemplified structure of a video signal input to a device having a phase-locked loop, such as a digital video decoder.
Figure 6:
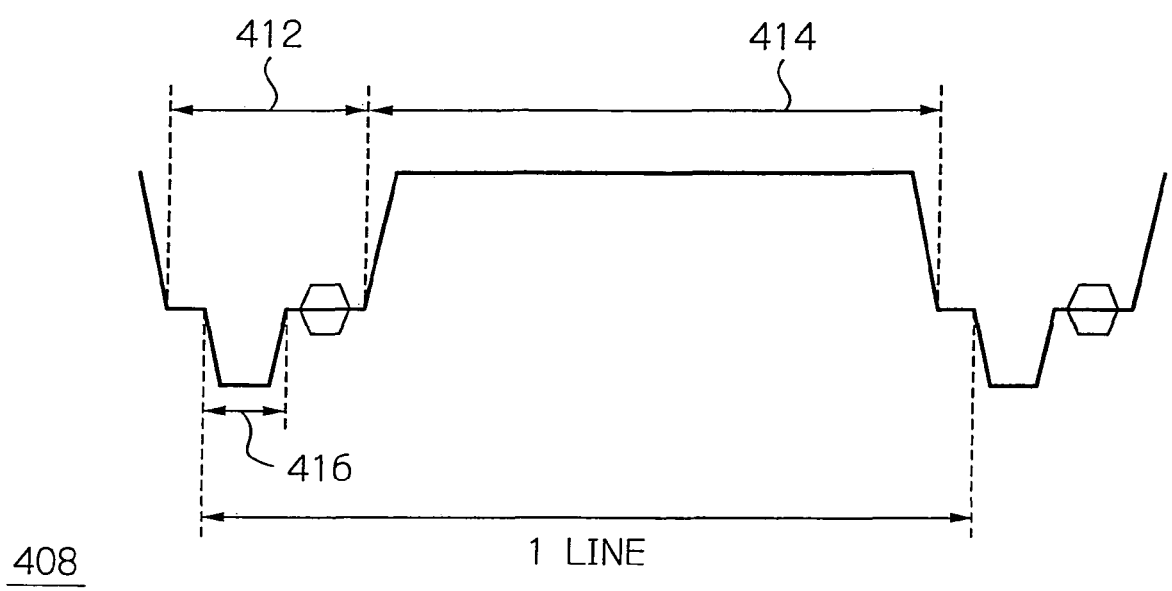
FIG. 6 is a partially enlarged view showing the video signal of FIG. 5.
Figure 7:
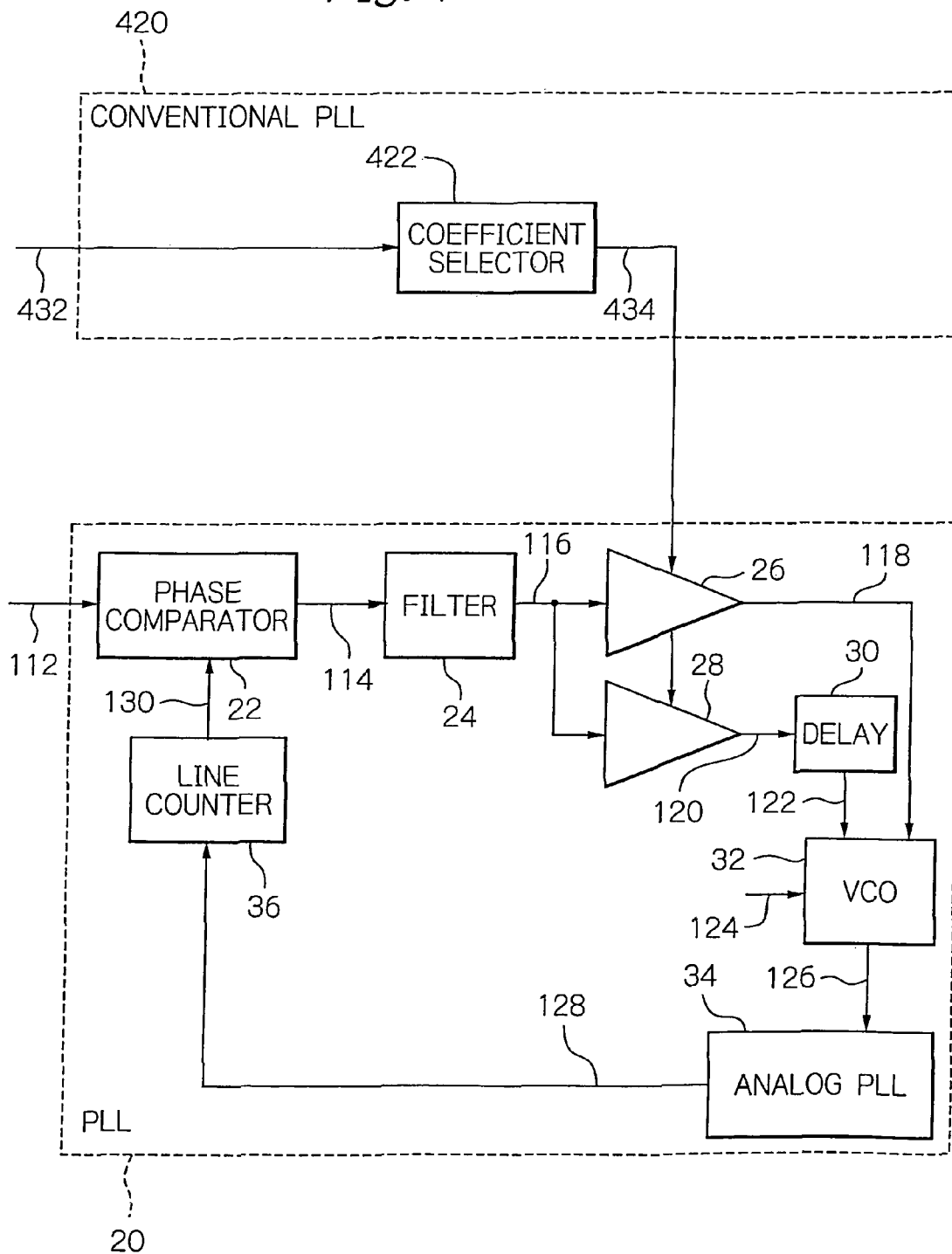
FIG. 7 is a schematic block diagram showing an example and its application of a conventional PLL controller.

A PLL controller 300 in accordance with a further alternative embodiment has the functions of both of the PLL controllers 10 and 200, and further include, as shown in FIG. 4, a detector 204 for special reproduction of a video cassette player to receive a count signal 222 from a field counter 202, a detector 206 for normal reproduction of a video cassette player and a detector 208 for weak electric field of television, and an error amount detector 12 to input a phase error voltage 102 provided by a phase comparator 22 in a phased locked loop 20. On the basis of detection results 224, 226 and 228, respectively from the detectors 204, 206 and 208 and also a detection result 104 from the error amount detector 12, a gain is determined by a coefficient selector 302.

The coefficient selector 302 is responsive to the detection result 224 or 226 to confirm the detection of a special reproduction signal of a video cassette player or a normal reproduction signal of a video cassette player, and in turn outputs a coefficient signal 106 indicating a larger gain. In the other case, the coefficient selector 302 is responsive to the detection result 228 to confirm the detection of a weak electric field signal of television to thereby output the coefficient signal 106 indicating a small gain.

Furthermore, the coefficient selector 302 outputs, when failing to detect all of the special or normal reproduction signal of a video cassette player and the weak electric field signal of television are not detected, the coefficient signal 106 indicating a gain determined according to the detection result 104 from the error amount detector 22. For example, according to the detection result 104 showing any of the N+1 segments, the coefficient selector 302 outputs the coefficient signal 106 indicating one of the N+1 gains which corresponds to the phase error 102. At this time, the error amount detector 12 and the coefficient selector 302 may output a smaller gain if the phase error 102 is smaller and a larger gain if the phase error 102 is larger.

The entire disclosure of Japanese patent application No. 2005-160915 filed on Jun. 1, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A phase-locked loop (PLL) controller for obtaining a phase error between a period of a horizontal sync signal in an input video signal and a reference period of a reference signal, filtering the phase error, and multiplying a result of filtering by a predetermined multiplier coefficient by a multiplier to control a phase-locked loop, comprising:
   a counter for receiving a vertical sync signal in the input video signal to count a number of lines for one field;
   a first detector for special reproduction of a video cassette player for utilizing a characteristic of the special reproduction signal of a video cassette player to determine whether or not the input video signal is a special reproduction signal of a video cassette player to produce a first detection result indicating whether or not the special reproduction signal of a video cassette player is detected;
   a second detector for normal reproduction of a video cassette player for utilizing a characteristic of the normal reproduction signal of a video cassette player to determine whether or not the input video signal is a normal reproduction signal of a video cassette player to produce a second detection result indicating whether or not the normal reproduction signal of a video cassette player is detected;
   a third detector for weak electric field of television for detecting whether or not the input video signal is a weak electric field signal of television to produced a third detection result indicating whether or not the weak electric field signal of television is detected; and
   a coefficient selector operative in response to the first, second and third detection results for detecting the predetermined multiplier coefficient, wherein,
   said first detector compares the number of lines input from said counter with the number of lines for one field in a normal video signal, thereby detecting the special reproduction signal of a video cassette player when both numbers of lines differ from each other, and, otherwise, producing the first detection result indicating that no special reproduction signal is detected;
   said second detector detecting a vertical blanking period and a position of a vertical sync pulse in the input video signal on a basis of the number of lines input from said counter, and determining, if a present line is during the vertical blanking period and before the vertical sync pulse, whether or not the phase error is large, thereby detecting the normal reproduction signal when the phase error is detected large, and, otherwise, producing the second detection result indicating that no normal reproduction signal is detected;
   said third detector tracking the phase error on a line-to-line basis to detect an error-fluctuating period, including an error with a longer period together with an error with a shorter period, said detector, said third detector detecting the weak electric field signal of television when the error-fluctuating period is detected over a predetermined times during one field period on a basis of the number of lines input from said counter, and, otherwise, producing the third detection result indicating that no weak electric field signal of television is detected, and
   the predetermined multiplier coefficient detected by said coefficient selector is provided to the phase-locked loop to thereby control a change of a tracking rate of said phase-locked loop.

2. The PLL controller in accordance with claim 1, further comprising:
   an error amount detector for measuring the phase error with one or more thresholds, then producing and outputting a control signal indicating one of a plurality of segments which corresponds to the phase error, the plurality of segments being formed by the one or more thresholds, wherein
   said coefficient selector receives the control signal from said error amount detector and detects the predetermined multiplier coefficient in response to the first, second and third detection results and the control signal, and then, in the case of the detection on the basis of the control signal, from a plurality of multiplier coefficients each of which corresponds to one of the plurality of segments, determining determines one of the multiplier coefficients which corresponds to the one segment indicated by the control signal.

3. The PLL controller in accordance with claim 2, wherein said coefficient selector stores in advance in a memory the plurality of multiplier coefficient which allow tracking rates to be controlled respectively appropriate for the plurality of segments.

4. The PLL controller in accordance with claim 2, wherein said coefficient selector detects the predetermined multiplier coefficient indicating the larger gain when the detection of the special reproduction signal of a video cassette player or the normal reproduction signal of a video cassette player is confirmed on the basis of the first and second detection results, and, otherwise, detects the predetermined multiplier coefficient indicating the smaller gain when the detection of the weak electric field signal of television is confirmed on the basis of the third detection result, said coefficient selector determining said predetermined multiplier coefficient by the detection on the basis of the control signal when all of the first, second and third detection results are not detected.

5. The PLL controller in accordance with claim 1, wherein said coefficient selector detects the predetermined multiplier coefficient indicating the larger gain when the detection of the special reproduction signal of a video cassette player or the normal reproduction signal of a video cassette player is confirmed on the basis of the first and second detection results, and, otherwise, detects the predetermined multiplier coefficient indicating the smaller gain when the detection of the weak electric field signal of television is confirmed on the basis of the third detection result or when all of the first, second and third detection results are not detected.

6. A method for controlling a phase-locked loop, comprising the steps of:
   obtaining a phase error between a period of a horizontal sync signal in an input video signal and a reference period of a reference signal;
   filtering the phase error;
   multiplying a result of filtering by a predetermined multiplier coefficient by a multiplier;
   receiving a vertical sync signal in the input video signal to count the number of lines for one field;
   utilizing a characteristic of the special reproduction signal of a video cassette player to determine whether or not the input video signal is a special reproduction signal of a video cassette player to produce a first detection result indicating whether or not the special reproduction signal of a video cassette player is detected;
   utilizing a characteristic of the normal reproduction signal of a video cassette player to determine whether or not the input video signal is a normal reproduction signal of a video cassette player to produce a second detection result indicating whether or not the normal reproduction signal of a video cassette player is detected;
   detecting whether or not the input video signal is a weak electric field signal of television to produced a third detection result indicating whether or not the weak electric field signal of television is detected;
   detecting the predetermined multiplier coefficient in response to the first, second and third detection results; and
   providing the predetermined multiplier coefficient to the phase-locked loop to thereby control a change of a tracking rate of the phase-locked loop, wherein
   said first detection result is determined by comparing the counted number of lines with the number of lines for one field in a normal video signal to indicate that the special reproduction signal of a video cassette player is detected when both numbers of lines differ from each other, and, otherwise, to indicate that no special reproduction signal is detected;
   said second detection result is determined by detecting a vertical blanking period and a position of a vertical sync pulse in the input video signal on the basis of the counted number of lines, and then, by determining, if a present line is during the vertical blanking period and before the vertical sync pulse, whether or not the phase error is large, to indicate that the normal reproduction signal is detected when the phase error is detected large, and, otherwise, to indicate that no normal reproduction signal is detected; and
   said third detection result is determined by tracking the phase error on a line-to-line basis, and then, by detecting an error-fluctuating period, including an error with a longer period together with an error with a shorter period, to indicate that the weak electric field signal of television is detected when the error-fluctuating period is detected over a predetermined times during one field period on the basis of the counted number of lines, and, otherwise, to indicate that no weak electric field signal of television is detected.

\* \* \* \* \*